United States Patent [19]
Duckworth

[11] Patent Number: 6,091,530
[45] Date of Patent: Jul. 18, 2000

[54] LOW POWER INFRARED COMMUNICATION SYSTEM

[75] Inventor: Reginald James Duckworth, Worcester, Mass.

[73] Assignee: Recall Services, Inc., Maynard, Mass.

[21] Appl. No.: 08/998,145

[22] Filed: Dec. 24, 1997

[51] Int. Cl.[7] .................................................. H04B 10/00
[52] U.S. Cl. ........................ 359/172; 359/143; 359/152; 340/825.72; 455/151.2
[58] Field of Search .................................. 359/143, 152, 359/147, 172, 113; 340/825.72; 455/151.2

[56] References Cited

U.S. PATENT DOCUMENTS

| | | | |
|---|---|---|---|
| 4,266,102 | 5/1981 | Stanley et al. | 179/90 |
| 5,157,640 | 10/1992 | Backner | 368/10 |
| 5,777,768 | 7/1998 | Korevaar | 359/172 |
| 5,861,969 | 1/1999 | Yasuda | 359/152 |
| 5,907,418 | 5/1999 | Walczak et al. | 359/142 |
| 5,982,520 | 11/1999 | Weiser et al. | 359/172 |

OTHER PUBLICATIONS

IrDA Data Link Design Guide, pp. 1–22, Hewlett Packard.

*Primary Examiner*—Kinfe-Michael Negash
*Attorney, Agent, or Firm*—Charles G. Call

[57] ABSTRACT

A low-cost, low-power, half-duplex communication system provides data transfer to and/or from an electronic watch or similar small electronic device. To accommodate the small size of the watch housing, data transfer is achieved using an infrared photodiode as a detector and an LED as an infrared emitter, directly coupled to the watch microcontroller with a minimum of additional components. Due to the small battery power capacity of electronic watches, the communication system is designed to have a negligible standby power consumption as well as low power consumption during data transfer. The IR emitter is connected directly to an output port on the microcontroller and the IR detector is connected to an input port on the microcontroller through a transistor amplifier. In standby mode, the microcontroller ports render the infrared devices and the transistor non-conducting to minimize power consumption. During transfer of information to and from the watch, the watch is placed in a cradle associated with a computing device and containing an infrared detector and an infrared emitter, designed so that the IR devices in the watch and cradle align in pairs when the watch is placed in the cradle.

19 Claims, 5 Drawing Sheets

LOW POWER INFRARED COMMUNICATION SYSTEM

FIELD OF THE INVENTION

The present invention relates to infrared communication systems and, in particular, to an apparatus for low power transmission and reception of infrared communication signals.

BACKGROUND

Electronic watches are now capable of providing more than simple time-keeping functions. Many electronic watches can provide such things as detailed information on appointments or other reminders, or even telephone and address information. This information is frequently entered into the watch through buttons on the watch case, a process which is often complex and tedious for the user. A faster and more convenient method of entry is to use a second device, such as a personal computer or Personal Digital Assistant (PDA), to enter the required information, followed by transferring the information to the watch. The difficulty with this method has been in finding a way to transfer the information quickly and reliably from the computer or PDA to the watch.

The small physical size and structure of a watch or similar personal device, such as a pendant timepiece or pager, provides unique challenges in the design of a communication system that can transfer information between the watch and another device. The small physical size of a watch severely limits the space available to house the components needed by the communication system. Moreover, only a limited supply of electrical energy is available at a low voltage and current from the watch battery. A typical watch battery has a nominal voltage of 3V and a current capacity of 150 mAh which provides a life of 2.5 years at a 7 microamp load.

One technique which has been used for the transfer of information to and from a watch utilizes metal contacts on the watch case which mate with connectors coupled to the computer or PDA to permit transfer information into the watch. Unfortunately, such contacts easily become dirty or damaged, causing the transfer to fail, and can expose the connected components to damage by Electro-Static Discharge (ESD).

Information may be transferred to and from a watch using an optical coupling mechanism which consist of an external transmitter having a flashing light and a light sensitive receiver located in the watch. The transmitter modulates the light with the information signal that is being sent to the watch, and the receiver detects the "on" and "off" conditions of the light to capture the data being sent to the watch. Such optical coupling arrangements also have problems: data is sent in one direction only to the watch, so that handshaking operations can't be used to implement desireable error control and syncronization functions, and data can't be sent back from the watch to an external data utilization device. Further, optical couplers are susceptible to background light interfering with the transmitted light; and typically operate at low data rates of only a few tens of bytes per second.

Existing and conventional bidirectional infrared communication systems have significant advantages over physical connections and unidirectional optical couplers Unfortunately, infrared communication mechanisms have large power consumption, require expensive additional components, or both. For example the IrDA Serial Infrared Data Link Standard promulgated by the Infrared Data Association for use with notebook computers, mobile phones, and other handheld devices communicating over distances up to 1 meter, requires an encoder and decoder interface to a UART and an IR transducer. The power requirements for such a system, while acceptable for the larger battery capacity available in a handheld device, would quickly drain a watch battery.

What is needed, therefore, is a low-power two-way communication link between a watch or other small electronic device and another electronic device such as a personal computer. This link would ideally use as few components as possible due to the small physical space available in a normal watch housing, add little to the cost of the system, and provide two-way communication so that stored information can be read from the watch, new information or commands to be loaded into the watch, and transmit acknowledgment messages to indicate whether prior messages were received correctly.

OBJECTS OF THE INVENTION

Accordingly, a primary object of the present invention is to conveniently and efficiently transfer data between an external data source or data utilization device and a watch or other small electronic device.

In particular, an object of the present invention is to transfer data using instrumentalities that operate effectively on the low current and voltage available from a small battery power sources and which are physically small to fit in the limited space available inside the housing of a watch case or the like.

A further particular object of this invention is to provide a high-speed, two-way, watch-to-personal computer transmission system capable of reliably sending hundreds of bytes of data per second.

SUMMARY OF THE INVENTION

This invention provides low-power, low-cost, two-way infrared communication between two electronic electronic devices, such as a battery operated watch and a data source or utilization device such as a personal computer. The invention requires a small number of components and places minimal demands on the battery power source. The invention provides rapid, two-way, half-duplex communication enabling stored information to be read from the watch, new information or commands to be loaded into the watch, and provides for acknowledgment messages indicating whether or not prior messages were received correctly. The system may also be used in applications where data or commands only needed to be sent in one direction.

The low-power infrared system consists of two main parts, an infrared transmitter and receiver device located in the electronic watch or other small battery-operated electronic device and an infrared transmitter and receiver device located in a cradle associated with a computing device. The watch device contains an infrared (IR) detector, an infrared emitter, in addition to the microcontroller used to implement the watch's conventional functions. The IR emitter is connected directly to an output port on the microcontroller and the IR detector is connected to an input port on the microcontroller through a transistor amplifier.

During transfer of information to and from the watch using the preferred embodiment of the invention, the watch is placed in the cradle. The cradle contains an infrared detector and an infrared emitter, and is configured such that, when the watch is placed in the cradle, the watch and cradle IR emitters and detectors are appropriately aligned and in close proximity to one another. In the preferred embodiment, the cradle is connected by a conventional RS232 serial communications pathway to a connected personal computer or the like.

Figure 5:
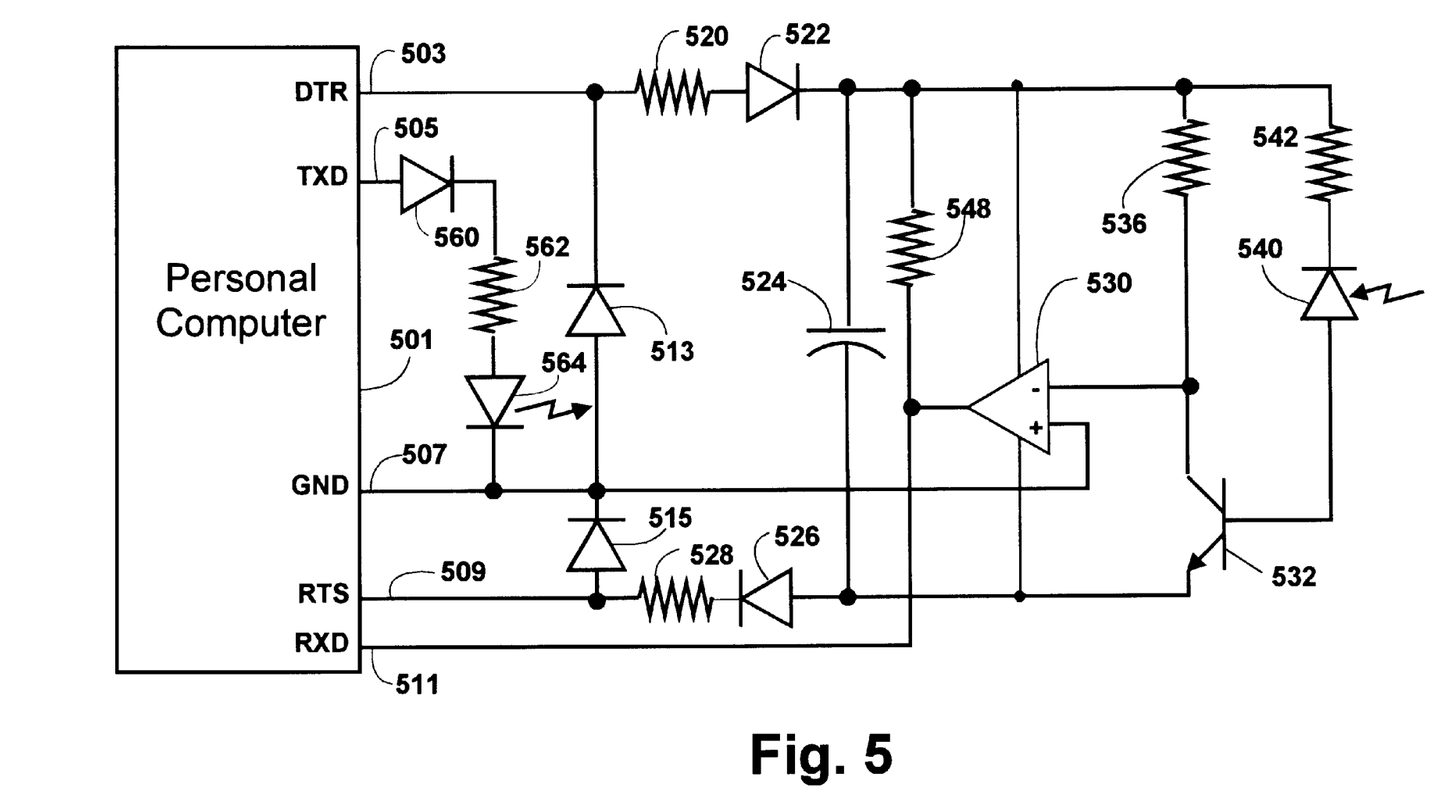
FIG. 5 is a schematic diagram of an alternative circuit which may be placed in the cardle portion of the embodiment described.

To conserve power, the watch IR detector is normally connected to a low voltage level when communication is not required. During communication between the watch and cradle, the watch IR detector device is connected to a high-voltage level. At the cradle, the RS232 logic levels are converted to normal TTL logic levels using the receiver portion of a transceiver discussed later in connection with FIG. 3, or alternatively the RS232 logic levels may be coupled via discrete circuit elements powered from the port connections as illustrated in FIG. 5. The output of the cradle receiver is connected to an IR emitter which is used to transfer data to the watch.

When the watch transmits IR signals, they are detected by the IR detector in the cradle. When the watch is placed in the communication mode, its microcontroller monitors the input port connected to the watch IR detector. After a valid start bit has been detected, a delay is started, after which the input port is sampled. The first byte of all messages is a special bit pattern, while the second byte indicates the type of message, which may be requesting stored information from the watch, or may be sending information or a command to the watch. If the message is requesting information or sending a command from the watch, then only three more bytes are received. The third byte is a count byte set to 0, the fourth byte is the checksum, and the fifth byte is a terminating message byte.

If the message is transferring information to the watch, a similar procedure is followed, but the message will contain additional message bytes and the Count byte indicates how many message bytes there are. After the end of each received message, the watch responds with an acknowledgment message, consisting of four bytes, that indicates whether the previous message was received correctly. In response to certain particular messages from the PC, the watch responds by transmitting a message containing specific data stored in the watch.

DETAILED DESCRIPTION

This invention was designed to allow data to be transferred via a low-power twoway infrared communications link between a personal computer or other computing device and a watch or other small battery-powered electronic device. Although in the preferred embodiment this invention provides two-way half-duplex communication, it may also be used in applications where data or commands only needed to be sent in one direction. The two-way communication allows stored information to be read from the watch as well as new information or commands loaded into the watch. Two-way communication also provides for a more robust communication channel, providing for acknowledgment messages indicating if prior messages were received correctly.

Figure 1:
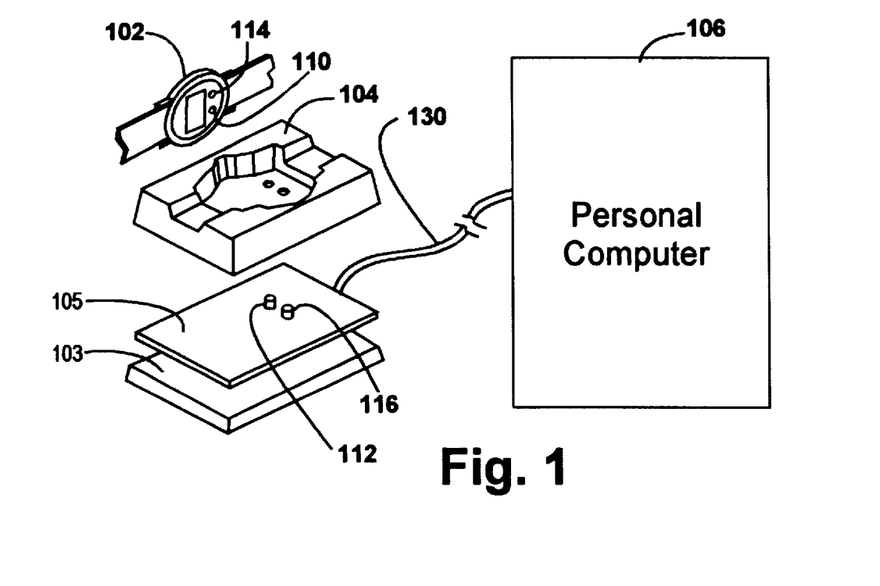
FIG. 1 is a block diagram illustrating an embodiment of invention which provides communication between an electronic watch or the like and a computer.

As seen in FIG. 1, the low-power infrared communication system consists of two main parts: an infrared transmitter and receiver device located in a first electronic device, such as the electronic watch shown in FIG. 1 at 102, and an infrared transmitter and receive device located in a second separable electronic device, illustrated in FIG. 1 an interface cradle consisting of a base plate 103, a shaped housing 104, and. The electronics in the cradle is coupled by a serial communication link 1230 to a computing device such as the personal computer illustrated in FIG. 1 at 106.

Figure 2:
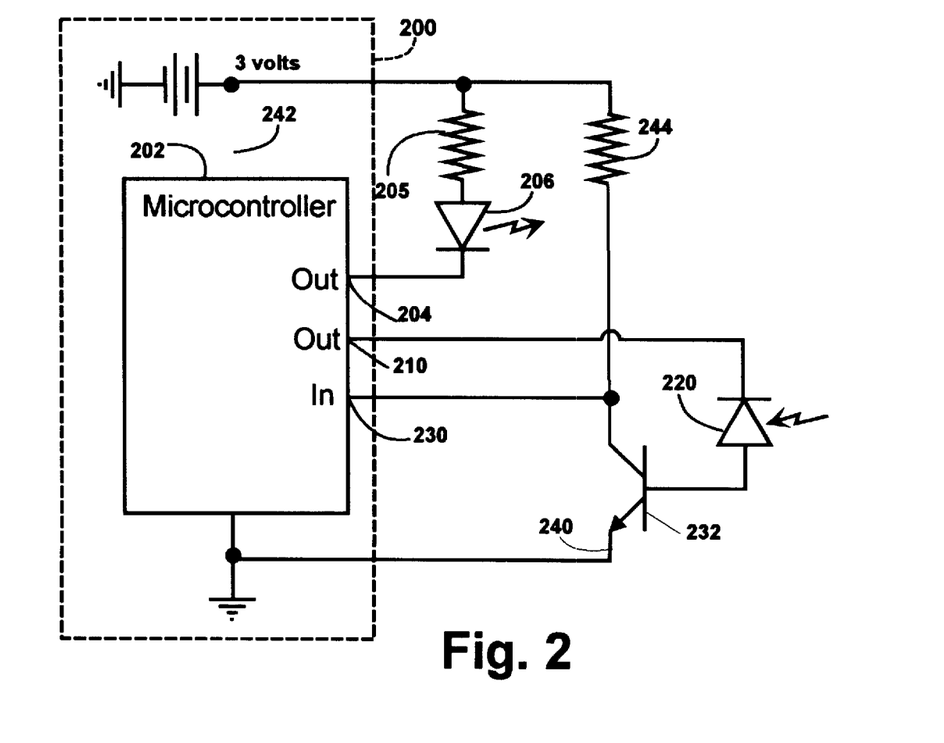
FIG. 2 is a schematic diagram of the communications electronics contained in the small, battery-operated electronic device, such as a watch, constructed in accordance with the present invention.

The watch 102 contains electronics and components required to implement the infrared (IR) communication system. The main components utilized are an infrared detector, an infrared emitter, and a microcontroller, as shown in FIG. 2. The need to use as few components as possible is due to the small physical space available in a normal watch housing, as well as the desire to minimize the system cost.

During transfer of information to and from the watch 102, the watch 102 is placed face down in the cradle housing 104. The watch includes an infrared emitter 110 and an infrared detector 114, both of which are positioned behind the translucent faceplate of the watch 102. The faceplate of watch 114 accordingly protects the infrared devices yet permits infrared signals to be sent from and received by the watch. The cradle includes electronic circuitry which includes an infrared detector 112 and an infrared emitter 116, one embodiment of the electronics being shown in detail in FIG. 3 and a second alternative arrangement is shown in FIG. 5. The cradle housing 104 is preferably shaped configured to receive and align the case of the watch 102 so that, when the watch 102 is placed in the shaped nest provided by 104, the watch IR emitter 110 is thereby aligned in close proximity with the cradle IR detector 112 and the watch IR detector 114 is aligned in close proximity with with the cradle IR emitter 116, forming a bidirectional IR link between these two separable electronic devices. In the preferred embodiment, the cradle 104 is coupled by conventional serial cable 130 to an external data handling device, illustrated in FIG. 1 by the personal computer 106.

The components used to implement the watch IR interface are shown in FIG. 2. The arrangement includes components within the dashed-line rectangle 200 which are typically already present in the watch or similar device, including a microcontroller 202, which is typically used to implement conventional functions. The microcontroller 202 is powered by a 3 volt battery 203. Only five low-cost components, seen outside the rectangle 200, are required to added to provide communications functions as contemplated by the invention. A resistance 205 and an IR emitter 206 are serially connected between the 3 volt battery 203 and an output port 204 of the microcontroller 202. In the preferred embodiment, the watch IR emitter 206 is a light emitting diode (LED), such as part number Hewlett-Packard (HP) HSDL4420. The HP HSDL4420 is a domed IR emitter which includes a lens which provides a 24 degree viewing angle with high on-axis intensity. An IR detector 220 is connected between a second output port 210 of the microcontroller 202 and the base of an NPN transistor 232. The collector-emitter path of the transistor 232 is serially connected with a resistance 244 between an input port 230 of the microcontroller 202 and ground. In the preferred embodiment, the watch IR detector 220 is an IR PIN photodiode in a subminiature SMT package (part number HP HSDL-5420 available from Hewlett-Packard), but any of the many similar devices known in the art could be used. The HP HSDL-5420 IR detector has the same lens design as the HP HSDL-4420 emitter, but with a black tint that reduces the effects of ambient light.

The low-power requirement for the system is due to the low voltage and current capacity available from the battery used to power the watch. A typical watch battery has a nominal voltage of 3V and a current capacity of 150 mAh which provides a life of 2.5 years at a 7 microamp load. By limiting the communication distance to one or two cm, the current requirements for an infrared communication system are drastically reduced. The duration of the communication is approximately 1 second. The current consumption of the watch components during the IR communication is less then 5 mA. This very low power requirement is less than is typically used when the watch buzzer is sounding.

To conserve power, the IR detector 220 is normally connected to a low voltage level 240 when communication is not required. During communication between the watch and cradle the IR emitter device 206 is connected to the 3V battery 203 through a resistor 205. The emitter 206 consumes power only when emitting light when the output port 204 is switched low to approximately ground potential.

The output port 210 on microcontroller 202 is used to disable or enable the IR detector 220. In the preferred embodiment, the watch microcontroller 202 normally operates at a frequency of 32.758 kHz. To support infrared communication at 9600 BAUD, the microcontroller 202 of this embodiment is switched from the normal low-speed (32.768 kHz) to high-speed (1 MHZ). The speed of communication allows a complete transaction (involving hundreds of bytes of data) to be reliably sent in approximately one second.

By carrying out the serial to parallel and parallel to serial conversion in software, it is not necessary to use a microcontroller with a UART. The IR emitter 206 is therefore connected directly to output port 204 on the microcontroller 202 and the IR detector 220 is connected to input port 230 on the microcontroller 202 through transistor amplifier 232. Reducing the number of external components and eliminating the need for a UART keeps the price of additional components needed on the watch to provide an IR communications link system to a minimum.

Figure 3:
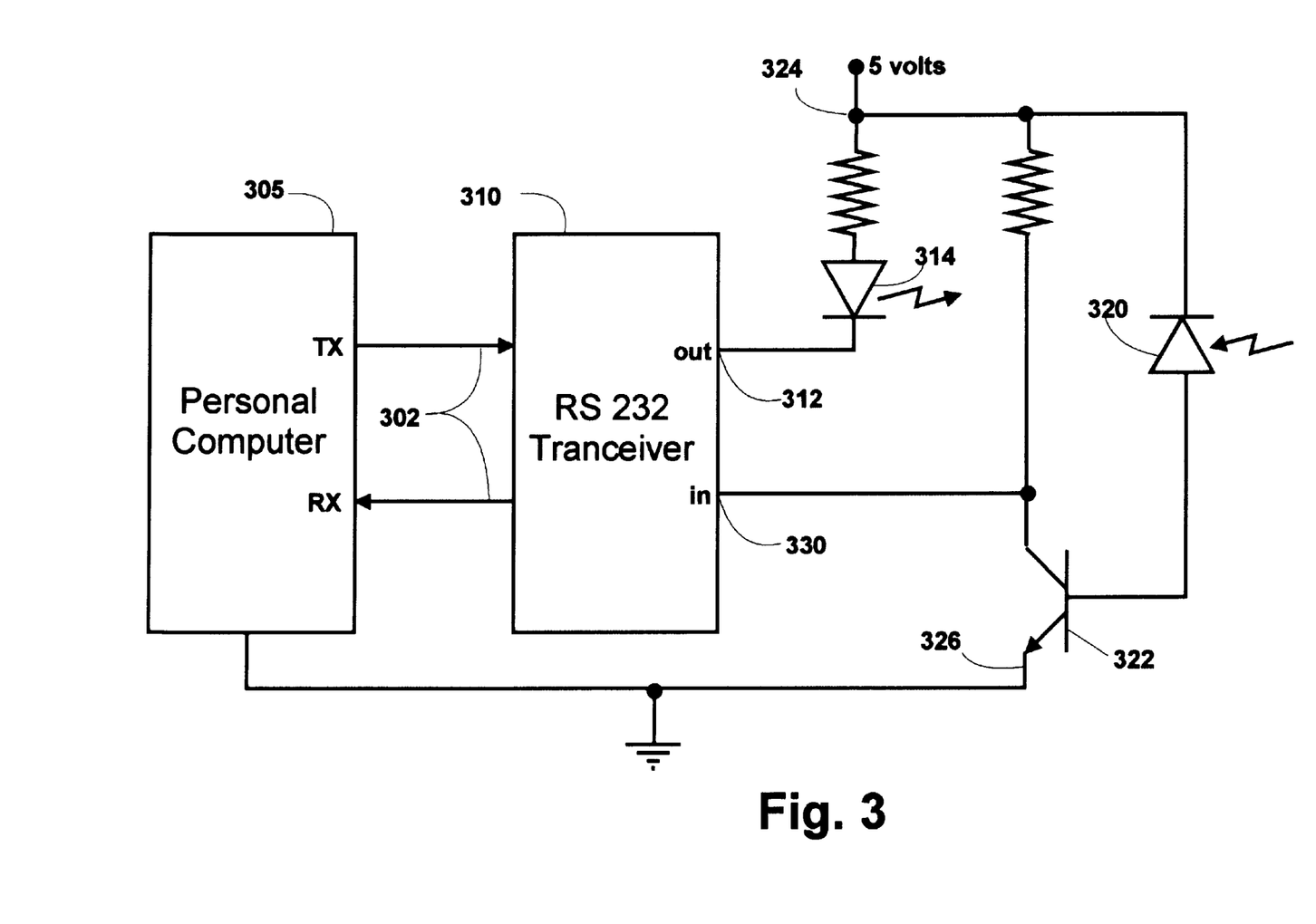
FIG. 3 is a schematic diagram of the communications electronics contained in the cradle portion of an embodiment of a system according to the present invention.

As shown in FIG. 3, data is transferred between the PC serial port and the cradle using a conventional RS232 communication connection 302 consisting of serial transmit and receive lines. A conventional serial port on the PC 305 is used with the following configuration: 9600 Baud/No parity/2 stop bits/half-duplex. The normal voltage on the line while idle (no data transmission) is –12V. A logic '0' bit is indicated with a +12V level and a logic '1' bit is indicated with a –12V level. The start of a byte is indicated with a start bit of logic '0'. This is followed by sending bits 0 to 7. The end of the byte is indicated by sending one or two stop bits of logic '1' which returns the line to the idle –12V level.

At the cradle, the RS232 logic levels are converted to normal TTL logic levels using the receiver portion of an RS232 transceiver IC 310. The output port 312 of the receiver 310 is connected to an IR emitter 314 which is used to transfer data to the watch. The IR emitter 314 is normally off when the received RS232 signal is –12V (idle condition).

During a start bit or '0' bit the IR emitter 314 is turned on, and during a stop bit or '1' bit the IR emitter 314 is turned off.

When the watch transmits IR signals, they are detected by the IR detector 320 in the cradle. The IR detector 320 is connected to a transistor 322 to amplify the IR detector current. When no IR transmission is detected, input 330 and collector of the transistor 322 is close to 5V (at 324) and, when an IR signal is received, the output at 312 is switched to ground at 326. The RS232 driver 310 which converts the 0 and 5V levels at input port 330 to RS232 output levels for transmission to the PC via the interface 302.

Figure 4A:
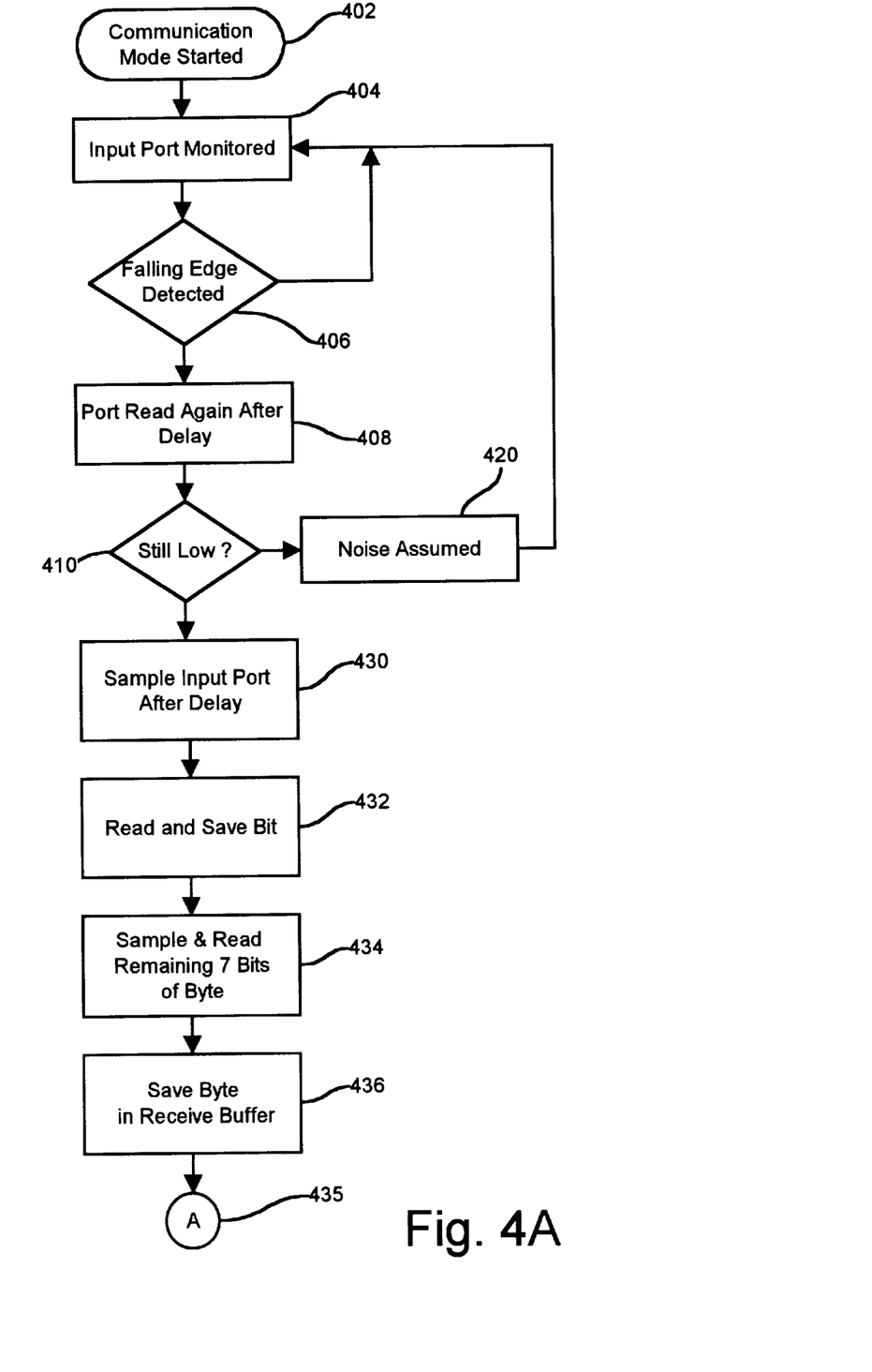
FIGS. 4A and 4B together are a flowchart illustrating the operation of a particular embodiment of an infrared communications system according to the present invention.
Figure 4B:
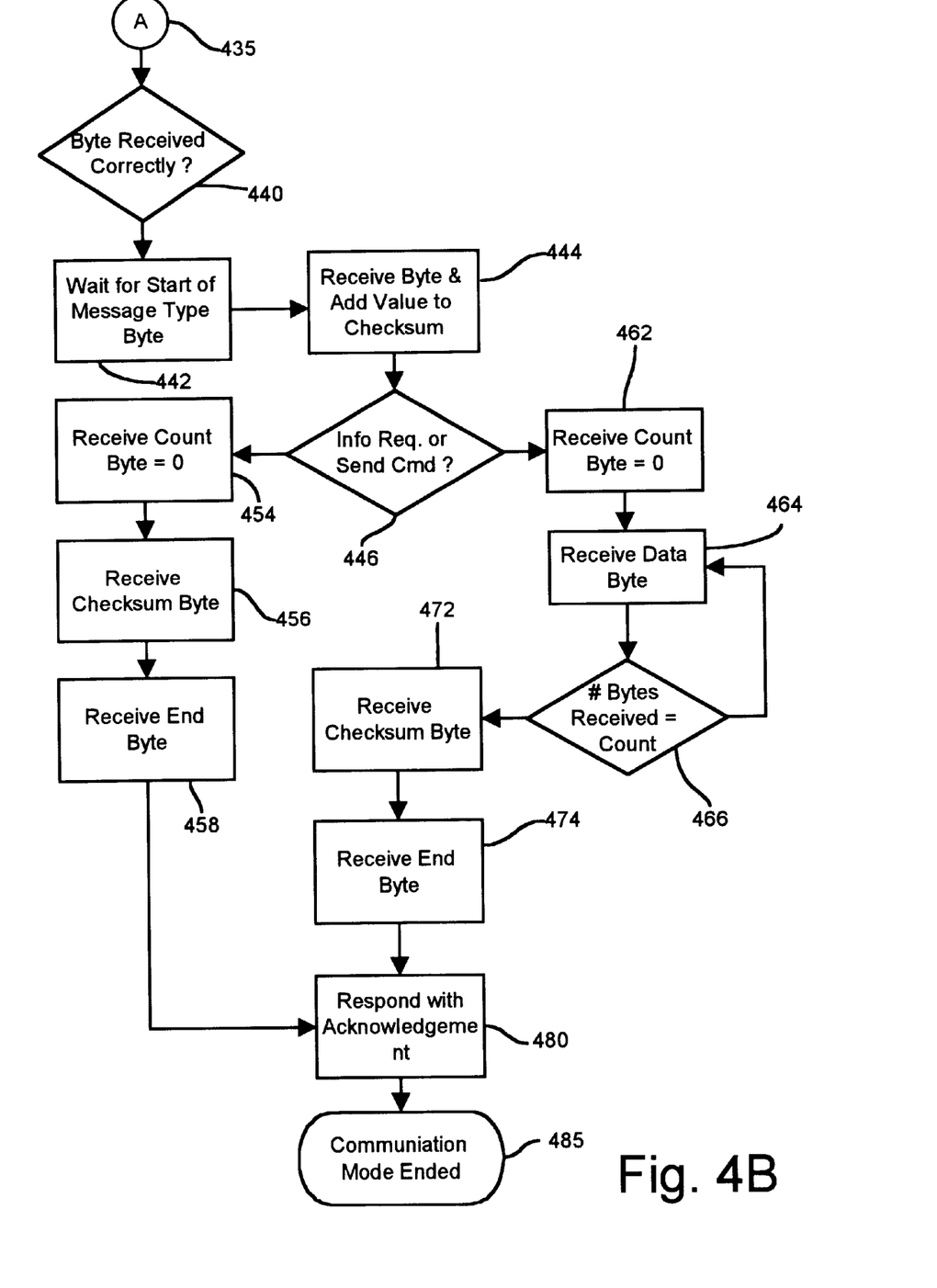

The operation of the system is shown in FIG. 4, in conjunction with the components of the preferred embodiment of FIGS. 2 and 3. When the watch is placed into communication mode 402, the microcontroller 202 monitors 404 input port 230 connected to the IR detector 220. The input port 230 is normally high. When a falling edge is detected 406, it is assumed that the start bit is being received. After a 50 us delay (approximately the middle of the start bit at 9600 BAUD), the input port 230 is read again 408, and if the bit is still low 410 then it is assumed that a valid start bit has been received 412 and the rest of the byte can be received 414. If the bit was high 420, then it is assumed that noise or extraneous light caused the transition and the microcontroller 202 software waits 404 for another falling edge.

As shown in FIG. 4 for the embodiment of FIGS. 2 and 3, after a valid start bit has been detected 412, a 104 us delay is started, at the end of which input port 230 is sampled 430. The input level at this time should coincide with the middle of bit 0 of the byte. The value of bit 0 is read and saved 432. The remaining 7 bits of the received byte are sampled and read in a similar way 434. The byte is then saved in a receive message buffer 436.

The first byte of all messages should be a special bit pattern (10101010 or OxAA). If the first byte is received correctly 440, the microcontroller software waits for the start bit of the second byte of the message 442. The second byte indicates the type of message. The message may be requesting stored information from the watch or may be sending information or a command to the watch. At the end of the received byte, the value of the byte is added to a checksum byte which will be used later to validate the message 444. If the first byte is not received correctly 440, the system sends acknowledgment message 480 indicating that an error occurred.

If the message is requesting information from, or sending a command to the watch 450, then only three more bytes are received. The third byte received 454 is a count byte set to 0. The fourth byte received 456 is the checksum (the sum of the MSG ID and Count bytes) and the fifth byte received 558 is a special terminating message byte (set to 0x5A). The entire transmission therefore takes the form:
Start/Mg ID/Count/Checksum/End If the message is transferring information to the watch, a similar procedure is followed, but the message will contain additional message bytes. The Count byte then indicates how many message bytes there are, and the message takes the form:
Start/Msg ID/Count/Msg O*/Msg N*/Checksum/End
Therefore, after the message type byte is received and processed 442, the third byte indicating the message byte count is received 462, followed by the first message byte 464. The system checks the number of bytes received against the count byte 466, and if more message bytes are remaining to be received 468, the system receives another one 464. After the last message byte has been read, the checksum 472 and terminating message bytes 474 are received.

After the end of each received message, the watch responds 480 with an acknowledgment message indicating whether the previous message was received correctly. The acknowledgment message consists of four bytes:
Start/Msg ID/Status/End
The first byte is set to 0xAA, the second byte is the message ID value from the previously received message, the third byte is set to 0x01 if the previous message was received correctly, or 0X0F if an error occurred. The end byte is 0x5A.

FIG. 5 shows an alternative circuit that may be housed within the cradle to provide communications between a personal computer seen at 501 and the watch electronics. Unlike the cradle electronics shown in FIG. 3 which employs an RS232 transceiver IC (seen at 310 in FIG. 3) and its own 5 volt power supply, the circuit seen in FIG. 5 employs a limited number of low cost discrete components and obtains its operating power directly from the serial port connection to the connected personal computer 501.

The circuit of FIG. 5 uses five of the serial port pins in a conventional RS232 serial port to the personal computer 501: the Data Terminal Ready (DTR pin 4) connection 503 which supplies +12 volts when active; the Transmit Data (TXD pin 3) connection 505 which switches between +12 volts when sending a "0" and −12 volts when sending a "1"; the ground (GND pin 5) connection 507 which is connected to common ground on the personal computer 501; the Request To Send (RTS pin 7) connection 509 which is at −12 volts when the personal computer 501 is ready to receive data; and the Receive Data (RXD pin 2) connection 511 which receives data at +12 volts ON and −12 volts OFF from the external source.

A surge suppressor 513 prevents the voltage on the DTR connection from exceeding approximatelyt +15 volts and surge suppressor 515 prevents the magnitude of RTS connection voltage from exceeding approximately −15 volts. The serial combination of a resistance 520, a diode 522, a capacitor 524, a second diode 526 and a resistance 528 is connected between the +12 volt DTR connecton 503 and the −12 volt RTS connection 511, establishing an operating voltage across capacitor 524 which is applied to a voltage comparator IC 530. The plus input to comparotor 530 is connected to the ground connection 507 and the minus input is connected to the collector of a transistor 532. The collector-emitter path of transistor 532 is connected in series with a collector resistance 536 across the capacitor 524. An infrared photodiode 540 acts as the infrared receiver and is serially connected with resistance 542 between the base of transistor 532 and the positive side of capacitor 524. The output of comparator IC 530 is directly connected to the RXD connection 511 of the serial port to computer 501 and is also connected by a resistance 548 to the positive side of capacitor 524. Each time incoming infrared radiation causes photodiode 540 to conduct, transistor 532 is turned ON, switching the minus input to comparator 530 to the negative side of capacitor 524 and delivering a positive ON pulse to the RXD connection 511.

Whenever the personal computer serial data transmit TXD connection is positive (indicating a "0"), current flows through the serial combination of a diode 560, a resistance 562 and an infrared light emitting diode (LED) 564 connected between the TXD connection 505 and the ground connection 507. The Hewlett Packard HSDL-4420 infrared light emitting diode may be employed as the infrared emitter 564 and a Hewlett Packard HSDL-5420 infrared photodiode may be used as the infrared detector 540.

In response to certain specific messages from the PC, the watch responds with a message containing specific data stored in the watch. The bytes are transmitted from the watch one bit at a time in the same manner as that in which data is transferred into the watch, as described previously in conjunction with FIG. 4.

What has been described is merely illustrative of the application of the principles of the present invention. Other arrangements, methods, modifications and substitutions by one of ordinary skill in the art are also considered to be within the scope of the present invention, which is not to be limited except by the claims which follow.

What is claimed is:

1. A low-power infrared communication system for transferring between first and second physically separable electronic devices, comprising, in combination:

a microcontroller located within said first electronic device, said microcontroller having an input port and at least one switched output port;

an infrared emitter comprising a light emitting diode directly connected to and operated by said switched output port;

an infrared detector connected to said input port to supply signals to said input port when illuminated by an incoming infrared signal; and a communications interface in said second electronic device adapted to receive infrared signals from said infrared emitter and further adapted to illuminate said infrared detector with said incoming infrared signal.

2. The communication system of claim 1, wherein said infrared detector comprises a photodiode coupled to a transistor for amplifying said signals applied to said input port of said microcontroller.

3. The communication system of claim 2, further including a transistor having a collector-emitter output circuit connected to said input port and a control input connected to said infrared detector.

4. The communication system of claim 1 wherein said communications interface comprises a second infrared emitter and a second infrared detector and means for physically aligning said second infrared emitter and said second infrared detector in close proximity to said infrared detector and said infrared emitter respectively in said first electronic device.

5. The communication system of claim 1, wherein said first device is a battery-operated electronic watch.

6. The communication system of claim 1, wherein said microcontroller has a second output port and wherein said infrared detector is additionally connected to said second output port such that said infrared detector is disabled by said second output port to conserve power when communication via said infrared detector is not required.

7. The communication system of claim 1, wherein said battery-operated device is an electronic watch having a translucent face panel and wherein said wherein said infrared detector and said infrared emitter are positioned to respectively receive and transmit infrared energy through said face panel.

8. The communication system of claim 1, wherein said battery-operated device is an electronic watch.

9. A low-power infrared communication system for transferring data from a battery operated electronic device, comprising, in combination:

a microcontroller located within said battery-operated device, said microcontroller having at least one output port and one input port;

a first infrared emitter located within said battery-operated device, said infrared emitter comprising a light emitting diode directly connected to one of said at least one output ports of said microcontroller to transmit outgoing infrared signals from said device;

a first infrared detector located within said battery-operated device and connected to said input port to receive incoming infrared signals;

a computer external to said device; and an interface unit coupled to said computer comprising:
a second infrared emitter,
a second infrared detector, and
mounting means adapted to position said second infrared detector in close proximity to said first infrared emitter and to position said second infrared emitter in close proximity to said first infrared detector to establish a bidirectional infrared communication link between said device and said interface unit.

10. A method for transferring data to and from a battery-operated electronic device comprising, in combination, the steps of:

providing said battery-operated electronic device with a first infrared emitter, a first infrared detector and a microcontroller, said first infrared emitter comprising a light emitting diode directly connected to an output port on said microcontroller and said first infrared detector being coupled to an input port on said microcontroller;

providing an interface unit in communication with a computing device, said interface unit having a second infrared detector, a second infrared emitter, and a circuitry for coupling said second infrared emitter and said second infrared detector to said computing device;

sending data from said computing device to said battery-operated electronic device by the steps, in combination, of:
sending an electrical data signal from said computing device to said interface unit;
applying said electrical data signal to said second infrared emitter to produce infrared radiation;
positioning said first infrared detector in close proximity to said second infrared emitter to receive said infrared radiation; and
applying an electrical data signal from said first infrared detector to said microcontroller; and sending data from said electronic device to said computing device by the steps, in combination, of:
directly applying a signal from said microcontroller to said first infrared emitter to produce emitted infrared radiation;
positioning said second infrared detector in close proximity to said first infrared emitter to receive said emitted infrared radiation to produce an outbound data signal; and
transmitting said outbound data signal to said computing device.

11. The method of claim 10, further comprising the step of transmitting an acknowledgment message to said microcontroller from said computing device by means of said first infrared detector and said second infrared emitter.

12. The method of claim 10, further comprising the step of conserving power usage in said electronic device by connecting said first infrared detector to a voltage supply only when data is being sent to said electronic device.

13. The method of claim 10, further comprising the step of amplifying said infrared signals received by said first infrared detector by means of a transistor connected between said first infrared detector and said microcontroller.

14. The method of claim 13 including the steps of connecting said first infrared detector to a switched output port of said microcontroller and for energizing said first infrared detector and said transistor by means of said switched output port only when infrared signals are to be received by said first infrared detector.

15. The method of claim 14, further comprising the step of exchanging acknowledgment messages between said microcontroller and said computing device by means of said electronic device infrared detector and emitter and said cradle infrared detector and emitter.

16. The method of claim 10, wherein said battery-operated device is an electronic watch.

17. A method for transferring data from a battery-operated electronic device comprising, in combination, the steps of:

providing said battery-operated electronic device with an infrared emitter and a microcontroller, said infrared emitter comprising a light emitting diode directly connected to an output port on said microcontroller;

providing a cradle device associated with a computing device, said cradle device having an infrared detector and a communications interface for converting from infrared signals to signals receivable by said computing device; and sending data from said electronic device to said computing device by the steps, in combination, of:
sending a signal from said microcontroller to said electronic device infrared emitter;
transmitting said signal to said cradle infrared detector;
transmitting said signal from said cradle infrared detector to said communications interface;
converting said signal from said cradle infrared detector to a signal receivable by said computing device at said communications interface; and
transmitting said converted signal to said computing device.

18. The method of claim 17, wherein said battery-operated device is an electronic watch.

19. The method of claim 17, further comprising the step of amplifying said infrared signals received by said cradle infrared detector from said electronic device infrared emitter by providing a transistor connected between said cradle infrared detector and said cradle communications interface.

* * * * *